Jan. 31, 1961    J. F. SCHOEPPEL ET AL    2,969,682
ROTATIVE DEVICE
Filed Oct. 17, 1957
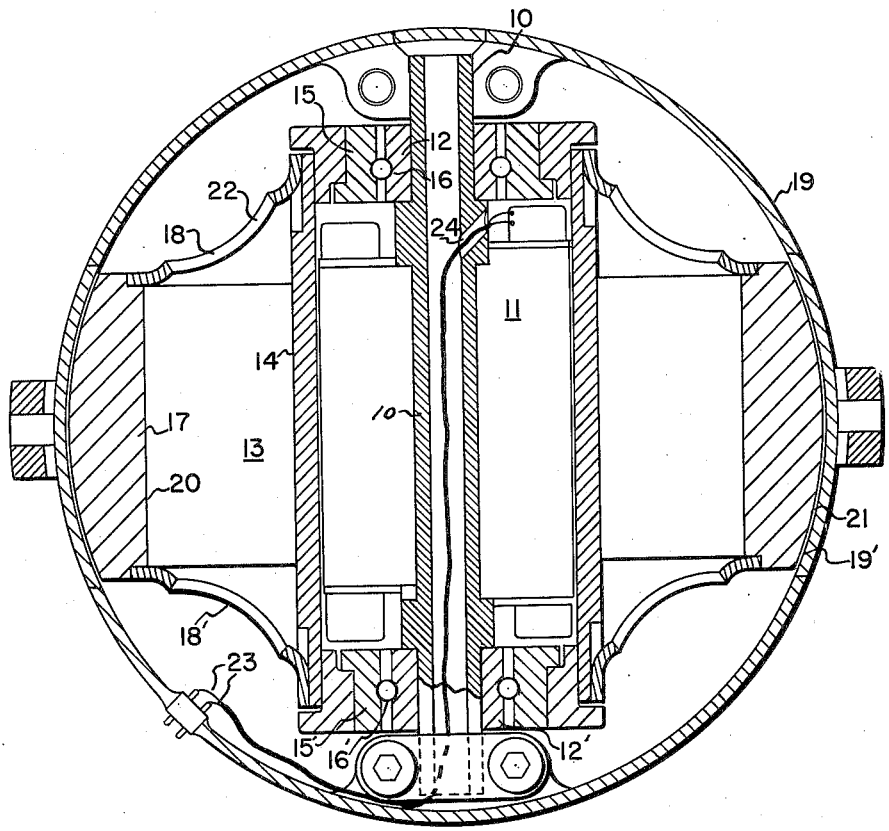

United States Patent Office 2,969,682
Patented Jan. 31, 1961

2,969,682

ROTATIVE DEVICE

John F. Schoeppel, Christian H. Will, Jr., and Roland Pittman, Grand Rapids, Mich., assignors to Lear, Incorporated Filed Oct. 17, 1957, Ser. No. 690,835

6 Claims. (Cl. 74—5.7)

The present invention relates to rotative devices and more in particular to the construction of gyroscopic structures.

The requirements of rotative devices and in particular those used in gyroscopic structures or for gyroscopes, or the like, are continuously and increasingly becoming more demanding of higher degrees of accuracy coupled with smaller overall dimensions and lighter weights. Various designs and methods have been proposed in attempts to increase the accuracy of gyroscropic structures and at the same time reduce the overall size and weight of the structure. Many various types of rotors, rotor and stator combinations and bearing alignment procedures for aligning and prestressing bearings supporting the rotor relative to the stator have been devised. The provision of rotative devices, gyroscopic structures and the like provides problems and consistently plaques the industry, and in particular the aircraft or other industries wherein the movement of movable bodies in exact paths of movement is accurately controlled by or in accordance with the rotative devices.

Therefore, one of the objects of the present invention is to overcome these and other problems heretofore encountered.

Another object of the present invention is to provide a rotative device which has maximum moment of inertia for a given weight.

Still another object of the present invention is to provide a device which has excellent isoelastic properties.

A further object of the present invention is to provide a gyroscopic device in which the rotor and stator are completely inclosed within a hollow sphere having an internal diameter approximately equal to both the axial length of the stator and the outer diameter of the rotor.

A still further object of the present invention is to provide a new, novel and efficient construction of a gyroscopic device which is accurate in operation, simple in design and easy to manufacture and assemble.

The invention also has for one of its objects a new and novel bearing structure and method of adjusting or prestressing the bearings in a gyroscopic device during manufacture thereof.

Other objects and a fuller understanding of the invention will become apparent from the following description and claims when taken in conjunction with the attached drawing which illustrates, in cross-section, a preferred embodiment of the invention.

In accordance with the present invention there is provided a rotative device, rotor, or the like, which comprises a hollow shaft, a member encircling the shaft and radially spaced therefrom, and end bells enjoining the ends of the member and the ends of the shaft. This rotor is symmetrical both about its axis of rotation, or its spin axis, and about a plane normal to that axis to provide excellent isoelastic properties. The member has a weight at least five times the combined weight of the end bells and the shaft and an internal diameter of at least twice the internal diameter of the shaft to provide maximum inertia for a given weight.

Further and in accordance with the invention, the rotor and an associated stator are inclosed within a sphere to provide a gyroscopic structure which is extremely accurate and overcomes the problems heretofore encountered. The stator has an axle of a length approximately equal to the outside diameter of the rotor and the inside diameter of the hollow sphere. The outer surface of the rotor conforms to an annular portion of the sphere and thus is complementary with the internal surface of the hollow sphere. The rotor is bearingly mounted at each end thereof on the ends of the axle, with the stator coils disposed within the hollow shaft of the rotor and between the bearings. In instances where accuracy requirements are exceedingly high, the bearings are prestressed ball bearings secured to their respective engaging parts by suitable cementitious hardenable materials, such for example, an epoxy resin. The gyroscopic structure is completed by providing stator energization current conductors extending through the axle and through the hollow sphere. These current conductors and the hollow sphere are preferably sealed so that a completely hermetically sealed or the like, gyroscopic structure is provided.

For purposes of illustration, and not of limitation, there is shown in the drawing a specific example of a gyroscopic structure including a rotative device constructed in accordance with the invention. This specific example depicts a gyroscope comprising an axle 10 supporting a stator 11 between end bearing inner races 12 and 12'. Encircling the stator 11 is a rotor 13 having a hollow rotor shaft 14 provided at each end thereof with the outer races 15 and 15' and balls 16 and 16' positioned between the inner and outer races. Rotor 13 also has an annular weight or member 17 encircling the hollow rotor shaft 14 and radially spaced therefrom. As is illustrated in the drawing, this member 17 has an outer diameter substantially equal to the length of the axle 10 and is attached to the hollow rotor shaft 14 by a pair of somewhat conical shaped perforated end bells 18 and 18'. These end bells 18 and 18' join the axial ends of the member 17 to the respective axial ends of the rotor shaft 14. The structure is completed by securing a hollow spherical member 19 to the opposite ends of the axle 10 in such manner that the spherical member 19 completely incloses the stator 11 and rotor 13.

As is further illustrated in the drawings, the member 17 is designed in such a way that it has a maximum inertia with as little weight as possible. The member 17 has a cylindrical inner surface 20 and a curved outer surface 21, the curved outer surface substantially defining an annular segment of a spherical surface which is spaced from the inner surface 19' of the sphere 19 a distance only sufficient to prevent the surfaces from engaging during rotation of the member 17.

The end bells 18 and 18' are secured to the ends of the rotor shaft 14 and the ends of the member 17 by soldering, brazing, gluing, bonding or other suitable fastening and joining means wherein fused metal or its equivalent for this purpose joins the end bells to the rotor shaft 14 and member 17 in such manner that the equivalent of a single piece or an integral structure is obtained. As illustrated, the end bells are provided with apertures 22 to reduce weight thereof so that a maximum portion of the total weight or the entire rotor including the hollow shaft 14, the end bells 18 and 18' and the member 17 is in the member 17. In a physical embodiment of the invention which was actually constructed, approximately 86% of the total weight of the end bells, hollow shaft 14 and the member appeared in the member 17. The member should have a weight at least five times the combined weights of the end bells and hollow shaft.

In addition, the annular member 17 has an internal diameter more than twice the diameter of the hollow rotor shaft and an axial length more than one-third its outside diameter. The member 17 also has an axial length greater than the internal diameter of the hollow rotor shaft 14. Thus, the end bells 18 and 18' are spaced apart a distance greater than the internal diameter of the rotor shaft 14. This spacing of the end bells and the proportions of the parts as herein set forth provide a rotor which is extremely stable in operation and which has a high inertia as compared to its weight.

It is further illustrated in the drawing that the hollow rotor shaft 14 has a length at least twice its internal diameter and is in electromagnetic association with the stator 11 in such manner that it is rotationally driven by the stator 11. The stator 11 is naturally provided with coils which are energizable from a suitable source of electrical energy through current conductors 23 which extend through a conduit opening 24 and outwardly through the sphere 19 at a desired location by suitable terminals commonly used for such purposes.

The hollow shaft 14, the member 17 and end bells 22 are constructed of metallic material to provide needed weight to the member 17 and electrical or magnetic properties to the hollow shaft 14 whereby the shaft will be rotated by the stator 11. Best results and synchronization of the rotor occur when the shaft 14 is constructed of ferrous material having three percent or more cobalt to provide residual magnetism to the shaft 14.

It is well known that metallic materials have a certain degree of elasticity and cannot be considered as absolutely rigid materials for gyroscope rotor purposes. During acceleration of the gyroscope rotor there is a tendency for the rotor to change its physical measurements, surface contours and configuration. In order to maintain the high degree of accuracy necessary for precision gyroscopes, it is necesary to have a rotor in which any slight variations in the structure of the rotor do not cause any mass or weight shifts along the spin axis which would impart precessional torques on the gyroscopes.

In the present design, any torques or forces developed internally of the end bells, the shaft 14, the member 17 or the completed assembly thereof are restrained within the rotor structure itself and are isolated from influencing the precision of the gyro. For example, any tendency on the part of the member 17 to pull the end bells 18 and 18' together during acceleration of the rotor is cancelled by the hollow shaft 14 which provides a rigid spacer for the end bells.

Since the rotor and bearings are constructed of material having a degree of elasticity, there will be a minute deformation occurring when the rotor and gyroscopic device are linearly accelerated.

Referring again to the drawing, the rotor is symmetrical both about the axis of rotation and about a plane normal to the rotor axis and bisecting the rotor. The elastic properties of the rotor are completley isolated from the bearings and the bearings are thus easily fixed in the required position needed to accurately pre-stress them so that they have known isoelastic properties. The outer bearing races 15 are mounted directly on the shaft 14 and cannot be urged toward each other during acceleration of the rotor. Pre-stressing of the bearings is accomplished by securing the inner races of both bearings on opposite ends of the axle 10 by an epoxy resin, or the like, which has qualities necessary to securely fix or bond the bearings on the axle. The outer races of the bearings are axially moved toward or away from each other until the exact predetermined friction characteristics necessary for precise operation of the gyro is obtained and the outer races 15 are then secured or bonded to the rotational hollow shaft 14 by suitable means, such as an epoxy resin or the like.

It is not necessary to consider any of the isoelastic properties of the rotor during pre-stressing and securing of the bearings in place. After the bearings have once been secured in place with the desired friction or pre-stressing characteristics and the epoxy resin has hardened, the shaft 14 and the axle 10 will hold the bearings accurately during acceleration of the rotor and operation of the gyroscope.

With this symmetrical structure, deformation of the rotor and bearings during linear acceleration occurs equally in different directions thereby maintaining the center of gravity in the line of action of the acceleration. The only torques which may be developed and imposed on the rotor as a result of the acceleration thereof, are in the directions of the spin axis, thereby providing precision operation of the gyroscope.

In view of the foregoing, it is thus apparent that the gyroscopic device has extremely good isoelastic properties.

Although the present invention has been described with a certain degree of particularity, it is understood that various modifications in the details and arrangements of parts may be had without departing from the spirit and scope of the invention as hereinafter claimed.

We claim:

1. A gyroscopic structure comprising an axle, an inner race secured to each end of said axle, a stator on said axle and between said inner races, a hollow rotor shaft, an outer race on each end of said rotor shaft and balls between each of said inner and each of said outer races supporting said rotor shaft for rotation about and by said stator and relative to said axle, an annular member encircling said shaft and radially spaced therefrom, said member having an outer diameter substantially equal to the length of said hollow shaft, a pair of somewhat conical shaped perforated end bells joining the axial ends of said member to the respective axial ends of said rotor shaft and a hollow spherical member secured to the opposite ends of said axle and inclosing said stator and said rotor.

2. The structure as defined in claim 1 wherein said member has a cylindrical inner surface and a curved outer surface substantially defining an annular segment of a spherical surface.

3. The structure as defined in claim 1 wherein said hollow rotor shaft has a length at least twice the internal diameter thereof.

4. The structure as defined in claim 1 including stator energization current conducting means extending through said axle and said spherical member.

5. The structure as defined in claim 1 wherein said member has an axial length greater than the internal diameter of the hollow rotor shaft.

6. The structure as defined in claim 1 wherein said member has an internal diameter more than twice the internal diameter of the hollow rotor shaft.

References Cited in the file of this patent

UNITED STATES PATENTS

| | | |
|---|---|---|
| 1,318,302 | Sperry | Oct. 7, 1919 |
| 1,573,028 | Bates | Feb. 16, 1926 |
| 1,978,425 | Gillmor | Oct. 30, 1934 |
| 2,410,002 | Bach | Oct. 29, 1946 |
| 2,641,132 | Barklow | June 9, 1953 |
| 2,827,788 | Campbell | Mar. 25, 1958 |
| 2,850,905 | Sedgfield | Sept. 9, 1958 |

FOREIGN PATENTS

| | | |
|---|---|---|
| 43,220 | Switzerland | Feb. 13, 1908 |
| 8,952 | Great Britain | Apr. 16, 1912 |
| 638,798 | Germany | Nov. 23, 1936 |